(12) United States Patent
Pennala et al.

(10) Patent No.: US 10,086,806 B2
(45) Date of Patent: Oct. 2, 2018

(54) BRAKE-BY-WIRE SYSTEM INCLUDING COASTDOWN MODE

(71) Applicant: GM Global Technology Operations LLC, Detroit, MI (US)

(72) Inventors: Brandon C. Pennala, Howell, MI (US); Paul A. Kilmurray, Wixom, MI (US); Christopher C. Chappell, Commerce Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 111 days.

(21) Appl. No.: 15/239,335

(22) Filed: Aug. 17, 2016

(65) Prior Publication Data

US 2018/0050672 A1  Feb. 22, 2018

(51) Int. Cl.
| | | |
|---|---|---|
| *B60T 7/12* | (2006.01) | |
| *B60T 8/17* | (2006.01) | |
| *G07C 5/08* | (2006.01) | |
| *B60T 7/04* | (2006.01) | |
| *B60T 13/66* | (2006.01) | |

(52) U.S. Cl.
CPC ............... *B60T 7/12* (2013.01); *B60T 7/042* (2013.01); *B60T 8/17* (2013.01); *B60T 13/662* (2013.01); *G07C 5/0808* (2013.01); *B60T 2270/402* (2013.01); *B60T 2270/403* (2013.01); *B60T 2270/82* (2013.01)

(58) Field of Classification Search
CPC .......... B60T 2270/82; B60T 7/12; B60T 8/17; B60T 2270/402; B60T 2270/403; B60T 7/042; B60T 13/662; G07C 5/0808
See application file for complete search history.

(56) References Cited

U.S. PATENT DOCUMENTS

| | | | | |
|---|---|---|---|---|
| 5,957,551 A * | 9/1999 | Maron | ...................... | B60T 1/10 303/15 |
| 6,607,251 B2 * | 8/2003 | Baumgartner | .......... | B60T 7/042 303/122.05 |
| 8,702,181 B2 * | 4/2014 | Drumm | ................. | B60T 8/4077 303/114.1 |

* cited by examiner

*Primary Examiner* — Khoi H Tran
*Assistant Examiner* — Robert T Nguyen
(74) *Attorney, Agent, or Firm* — Cantor Colburn LLP

(57) ABSTRACT

A vehicle is provided. The vehicle includes a vehicle system. The vehicle system includes a brake-by-wire portion, which also includes a controller. The controller can cause a forced coastdown of the vehicle. The forced coastdown includes performing analyzing conditions of the vehicle system to determine whether the vehicle is in a stable state and to determine an amount of energy available to the vehicle system and automatically applying the forced coastdown when the vehicle is not in the stable state and the amount of energy is less than or equal to a threshold for continued manual operation of the vehicle. The forced coastdown also includes utilizing brake pressure to reduce a speed of the vehicle.

20 Claims, 5 Drawing Sheets

BRAKE-BY-WIRE SYSTEM INCLUDING COASTDOWN MODE

FIELD OF THE INVENTION

The invention disclosed herein relates to a vehicle having a brake-by-wire system including coastdown mode.

BACKGROUND

Conventional braking systems provide direct mechanical linkages and/or hydraulic force-transmitting-paths between an operator and brake control units of the vehicle. Conventional braking systems also add a significant weight penalty to the vehicle itself. Thus, reducing or replacing the conventional braking systems is desirable.

Current industrial trends include reducing a number of overall mechanical components and an overall weight of the vehicle through system-by-wire applications, also referred to as X-by-wire systems. One such X-by-wire system is a brake-by-wire system, which may be referred to as an electronic braking system (EBS). Present implementations of brake-by-wire systems may not to include electrical redundancy vs mechanical redundancy (e.g., duplication of hardware and/or software to account for component failures), fault tolerance (e.g., overcoming undesired events affecting control signals, data, hardware, software or other elements of such systems), fault monitoring (e.g., detecting undesired events), and other security mechanisms to ensure braking.

SUMMARY OF THE INVENTION

In one exemplary embodiment, a vehicle is provided. The vehicle comprises a vehicle system. The vehicle system comprises a brake-by-wire portion comprising a controller. The controller is configured to cause a forced coastdown of the vehicle by causing the vehicle system to perform analyzing conditions of the vehicle system to determine whether the vehicle is in a stable state and to determine an amount of energy available to the vehicle system; and automatically applying the forced coastdown when the vehicle is not in the stable state and the amount of energy is less than or equal to a threshold for continued manual operation of the vehicle, wherein the forced coastdown comprises utilizing brake pressure to reduce a speed of the vehicle.

In another exemplary embodiment, a method of executing a forced coastdown of a vehicle is provided. The method is implemented by a controller of a brake-by-wire portion of a vehicle system of the vehicle. The method comprises analyzing conditions of the vehicle system to determine whether the vehicle is in a stable state and to determine an amount of energy available to the vehicle system; and automatically applying the forced coastdown when the vehicle is not in the stable state and the amount of energy is less than or equal to a threshold for continued manual operation of the vehicle, wherein the forced coastdown comprises utilizing brake pressure to reduce a speed of the vehicle.

The above features and advantages are readily apparent from the following detailed description when taken in connection with the accompanying drawings and claims.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
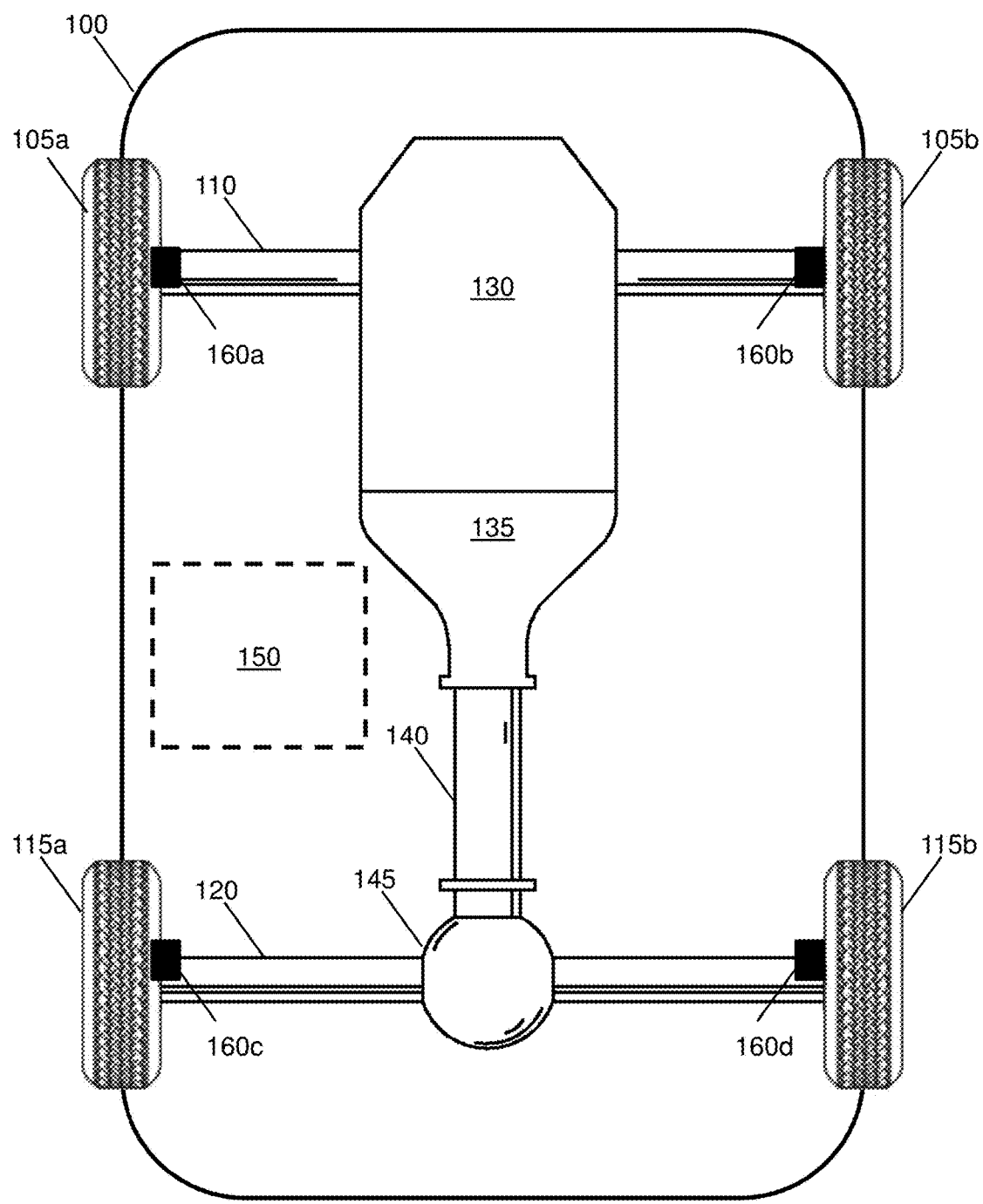
FIG. 1 is a top schematic view of a vehicle having a brake-by-wire system in accordance with an embodiment.

The following description is merely exemplary in nature and is not intended to limit the present disclosure, its application or uses. It should be understood that throughout the drawings, corresponding reference numerals indicate like or corresponding parts and features.

In accordance with an embodiment, FIG. 1 is a top schematic view of a vehicle 100. As illustrated in FIG. 1, the vehicle 100 includes a first wheel pair 105 (e.g., a wheel 105a and a wheel 105b), a first axle 110, a second wheel pair 115 (e.g., a wheel 115a and a wheel 115b), a second axle 120, an engine 130, a transmission 135, a driveshaft 140, a differential assembly 145, a brake-by-wire system 150, and a plurality of brake assemblies 160a-d.

The vehicle 100 may be any automobile, truck, van, sport utility vehicle, or the like. As used herein, the term vehicle is not limited to just an automobile, truck, van, or sport utility vehicle, but may also include any self-propelled or towed conveyance suitable for transporting a burden. Thus, it should be appreciated that the brake-by-wire system 150 described herein may be used with any type of vehicle.

The vehicle 100 may include an engine 130, such as a gasoline or diesel fueled internal combustion engine. The engine 130 may further be a hybrid type engine that combines an internal combustion engine with an electric motor. The engine 130 may also be entirely electric. The engine 130 can be coupled to a frame or other chassis structure of the vehicle 100.

The vehicle 100 may include the first wheel pair 105 arranged adjacent the engine 130 (and connected via a transmission, a driveshaft, a differential assembly, etc., each of which is not shown for simplicity). The engine 130 can also be coupled to the second wheel pair 115 through the transmission 135, the driveshaft 140, and the differential assembly 145. The wheels 105a, 105b, 115a, 115b can be configured to receive outputs from the engine 130 individually, as pairs, or in conjunction with one another.

For example, when the engine 130 is engaged with one or both of the first wheels (105a and 105b), the vehicle 100 may be said to include a front-wheel drive configuration. When the engine 130 is engaged with one or both of the second wheels (115a and 115b), the vehicle 100 may be said to include a rear-wheel drive configuration. When the engine 130 is simultaneously engaged with both the first wheel pair 105 and the second wheel pair 115, the vehicle 100 may be said to include a four-wheel or an all-wheel drive configuration.

The transmission 135 may be configured to reduce a rotational velocity and increase a torque output of the engine 130. In an embodiment, a modified output can then be transmitted to the differential assembly 145 via the driveshaft 140. The differential assembly 145 transmits the output torque from the driveshaft 140 through a differential gear set to the second wheel pair 115 via the second axle 120. The differential gear set is arranged within the differential assembly 145.

The vehicle 100 includes the brake-by-wire system 150 and at least one of the brake assemblies 160a-d. The brake-by-wire system 150 can be an exclusive-by-wire-system that enables braking torque to the wheels (105a, 105b, 115a, and 115b). Each of the brake assemblies 160a-d can be a device for applying braking torque to the wheels (105a, 105b, 115a, and 115b) to slow or stop a motion of the vehicle 100, such as by contact friction, magnetic operation, etc.

The brake-by-wire system 150 can include one or more components, such as electrical motors, actuators, driver interface devices, emulators, isolators, power electronics, control electronics, modules, drivers, and the brake assemblies 160a-d. The components can be electronically coupled and located throughout the vehicle 100.

For example, the brake-by-wire system 150 can utilize and distribute electrical power from power electronics, such as battery sub-systems of the vehicle 100 or the brake-by-wire system 150 to the components therein. Further, the brake-by-wire system 150 can also include driver interface devices, such as a brake pedal, a parking brake lever, an input button/dial/lever, etc. Each of the driver interface devices can cause the direct application of braking torque (e.g., amount of clamping force) to the wheels (105a, 105b, 115a, and 115b), provide an electrical boost to mechanical and/or hydraulic braking systems, and/or support braking when there is no way to generate braking torque from the application of the brake pedal. Thus, the brake-by-wire system 150 can forgo, supplement, assist, or include a mechanical back-up.

In an embodiment, the plurality of brake assemblies 160a-d can be physically and/or electrically connected by electrical conductors (e.g., wires) to the brake-by-wire system 150, and thus can be considered included therein. Each of the plurality of brake assemblies 160a-d can be referred to as a brake corner, a brake assembly, a caliper/rotor assembly, etc. In general, a brake corner can include a caliper, a rotor, an isolator, a driver, and an actuator, where the actuator applies a clamping force from the caliper to the rotor based on a deceleration signal received through the isolator and the driver. Thus, each of the plurality of brake assemblies 160a-d can be configured to selectively slow the rotation of an associated wheel (105a, 105b, 115a, or 115b).

Each of the plurality of brake assemblies 160a-d can be configured to respond, whether independently or in concert, to a deceleration action from the brake-by-wire system 150. For instance, by applying braking torque to a brake pedal, activating a parking brake, operating an input button or lever, etc., an operator of a vehicle causes a deceleration signal to be sent from the brake-by-wire system 150 to the plurality of brake assemblies 160a-d.

With respect to the brake pedal, force and travel sensors can be coupled to the brake pedal to detect elements of a clamping force and/or calculate an amount of the clamping force. The clamping force can be translated by the brake-by-wire system 150 into the deceleration signal. A sensor is any converter that measures physical quantities and converts these physical quantities into a signal (e.g., raw sensor data, such as voltage in analog form; also referred to as analog sensor data). Thus, a sensor can be any device configured to detect status/condition information of mechanical machinery of the vehicle 100 of FIG. 1 and/or control electronics of the vehicle 100 of FIG. 1 and produce the analog sensor data. Examples of sensors include, but are not limited to, strain gauges that measure the physical stress or force applied (e.g., fiber optic gauges, foil gauges, capacitive gauges, etc.); travel sensors that measure movement (e.g., accelerometers, gyroscopes, etc.); and temperature sensors that measure the temperature characteristics and/or the physical change in temperature (e.g., fiber optic temperature sensors, heat meters, infrared thermometers, liquid crystal thermometers, resistance thermometers, temperature strips, thermistors, thermocouples, etc.).

With respect to the parking brake, a travel sensor can be coupled to the parking brake to detect an on-position that is translated by the brake-by-wire system 150, which in this case can indicate a predetermined clamping force that provides a full stop. The input button/dial/lever can also operate to receive an input from the operator to enable the brake-by-wire system 150 to generate, as the deceleration signal, a predetermined and/or variable clamping force. The deceleration signal causes the plurality of brake assemblies 160a-d, whether individually or in concert, to apply a braking torque on corresponding wheels that result in wheel rotational deceleration.

Figure 2:
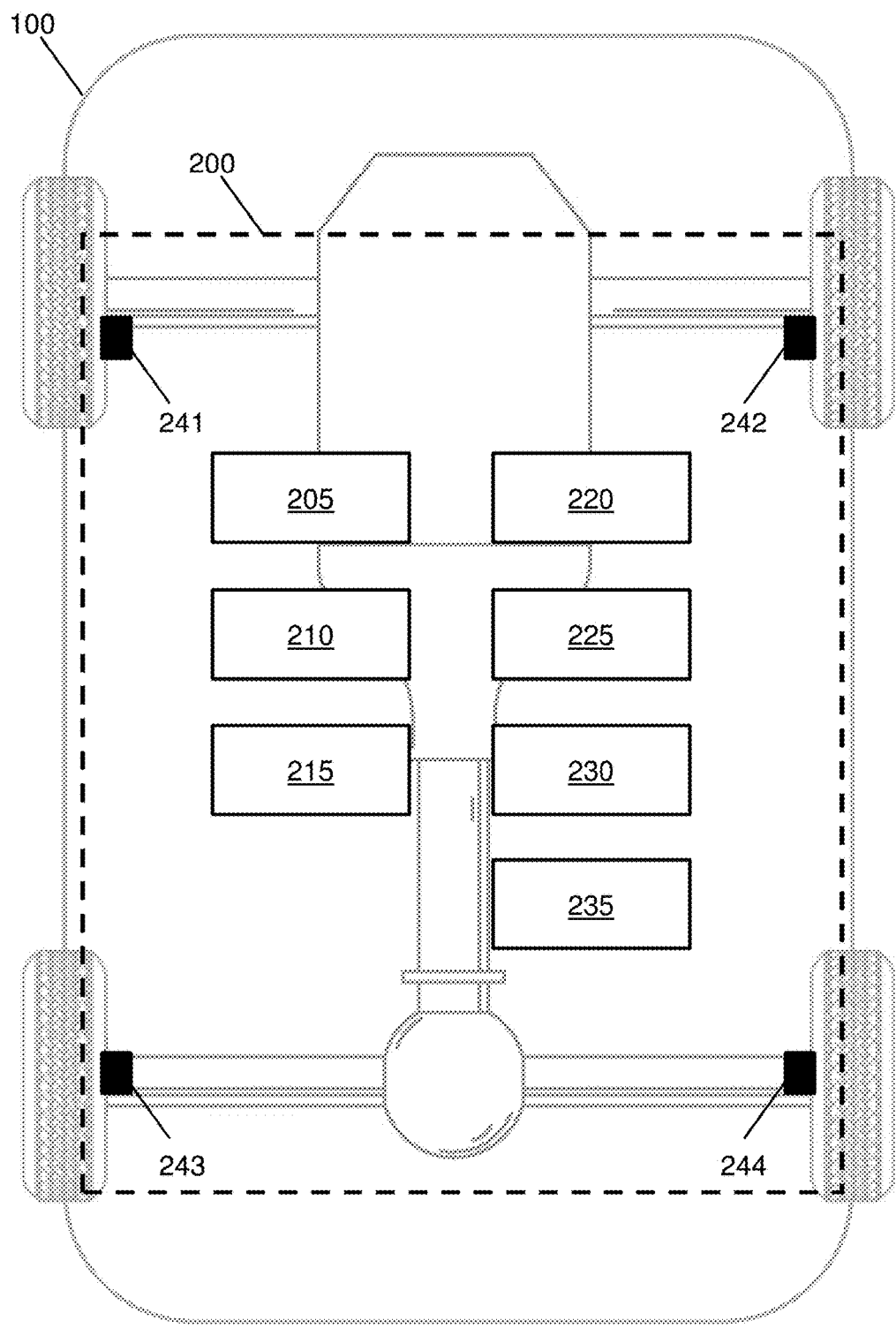
FIG. 2 is a top schematic view of a brake-by-wire system in accordance with an embodiment.

The brake-by-wire system 150 will now be described according to an embodiment and with reference to FIG. 2. As illustrated, the brake-by-wire system 150 can be embodied as a system 200. The system 200 can include a controller 205, an actuator 210, a driver interface device 215, an isolator 220, a driver 225, power electronics 230, a module 235, a first brake 241, a second brake 242, a third brake 243, and a fourth brake 244. The components of the system 200 can be electronically coupled and located throughout the vehicle 100 of FIG. 1, along with being configured to communicate/interact with each other. While single items are illustrated by FIG. 2 for each component of the system 200, these representations are not intended to be limiting and thus, the each component may represent a plurality of that component. It should be appreciated that the system 200 can include other components used in the operation of the vehicle 100 of FIG. 1, that the system 200 may also include fewer modules, that the components can be embodied in separate arrangements in a distributed manner, and that the components can be an integrated control scheme.

The system 200 can be referred to as a control system of the brake-by-wire system 150. The system 200 can, via input/output (I/O) interfaces, receive inputs, such as operator input from the driver interface device 215 and environmental inputs from sensors of the vehicle 100 of FIG. 1. The I/O interfaces can include any physical and/or virtual mechanisms utilized by the system 200 to communicate between components internal and/or external to the system 200 (e.g., the I/O interfaces can be configured to receive or send signals or data within or for the system 200). The inputs are processed by the controller 205.

The controller 205 can generate commands and/or currents to drive the actuator 210. In general, the controller 205 receives a signal from the driver interface device 215, processes the signal, and generates a command to the driver 225 based on the processed signal (e.g., the driver in turn communicates with the actuator 210, which operates one or more of the brakes 241-244). In another embodiment, the sensors detect travel/force/etc. imparted by an operator of the vehicle 100 of FIG. 1 when commanding deceleration. The travel/force/etc. signals are used to determine an amount of deceleration (e.g., a clamping force). The driver 225 communicates the amount of deceleration with the driver interface device 215, which is further communicated to the actuators 210 and actually applied to the brakes 241-244 at the wheels.

The controller 205 includes any processing hardware, software, or combination of hardware and software utilized by the system 200 that carries out computer readable program instructions by performing arithmetical, logical, and/or input/output operations. The controller 205 can include a memory (e.g., a tangible device) configured to store software and/or computer readable program instructions. Examples of the controller 205 include, but are not limited to, an arithmetic logic unit, which performs arithmetic and logical operations; a control unit, which extracts, decodes, and executes instructions from a memory; and an array unit, which utilizes multiple parallel computing elements. Other examples of the controller include an electronic control module/unit/controller, electronic parking brake module, and an application specific integrated circuit. In an embodiment, the system 200 can include two or more controllers 205 to meet requirements of power assist failures, such that if a first controller fails then a second or subsequent controller 205 continues operation.

The actuator 210 can be any type of motor that converts energy into motion, thereby controlling the movement of a mechanism, such as the brakes 241-244, based on received signals. Thus, the actuator 210 can be a direct current motor configured to generate electro-hydraulic braking torque to the corner (e.g., the brake corner, the brake assembly, the caliper/rotor assembly, etc.). The driver interface device 215 can be any combination of hardware and software that enables a component of the system 200 to behave like a component not included in, or replaced by, the system 200. For example, the driver interface device 215 can be a pedal emulator that behaves like a mechanical pedal of a hydraulic braking system. The isolator 220 can be device that transmits signals (e.g., microwave or radio frequency power) in one direction only and shields components on an input side, from the effects of conditions on an output side.

The driver 225 can be a device that transmits signals based on commands of the controller 205 to the actuator 210. The driver 225, like the controller 205, can include any processing hardware, software, or combination of hardware and software utilized by the system 200 that carries out computer readable program instructions by performing arithmetical, logical, and/or input/output operations. The driver 225 can include a memory (e.g., a tangible device) configured to store software and/or computer readable program instructions.

The power electronics 230 can control and manage electrical power throughout the system 200 and vehicle 100 of FIG. 1. The power electronics 230 can include, but are not limited to, batteries, fuses, semi-conductor based devices that are able to switch quantities of power, rectification devices, AC-to-DC conversion devices, and DC-to-AC conversion devices. The power electronics 230 can include or be in communication with first and secondary power sources to operate the system 200. For example, the first power source can be a primary 12 volt system that provides all power to run engine 130 of FIG. 1 etc., and the secondary power source can be a battery that powers the vehicle 100 of FIG. 1 when the primary power source fails.

The module 235 can include any processing hardware, software, or combination of hardware and software utilized by the system 200 to receive and respond to signals within the system. The module 235 can be embodied within the controller 205 as hardware and/or computer readable program instructions stored on a memory of the controller. Thus, in an embodiment, the controller 205 can be referred to as an electronic brake controller that includes a plurality of modules 235 (e.g., sub-components), such as an electronic parking brake module and a brake assist module.

In an embodiment, the electronic parking brake module transmits a signal to a plurality of actuators 210 causing brake calipers of the brakes 241-244 to clamp rotors with the desired amount of clamping force. This transmitted signal can include a clamping force, which in this case can indicate a predetermined clamping force that provides a full stop.

The brake assist module can determine parameters associated with deceleration actions and determine if assistance should be provided to aid braking and how much assistance is to be applied. The brake assist module can send a signal to an engine control module to request that an engine reduce the power output, which will aid in decelerating the vehicle 100.

The brake assist module further monitors the operation of the vehicle 100 of FIG. 1, such as via the brake apply sensors (e.g., brake pedal travel and brake pedal force) and the wheel speed sensors. In the event that the brake assist module determines, such as via sensors that indicate the vehicle 100 of FIG. 1, the brake-by-wire system 150, or the system 200 of FIG. 2 is not operating at a desired performance level, a signal may be transmitted to the electronic parking brake module.

The brakes 241-244 are devices for slowing or stopping motion of the vehicle 100 of FIG. 1. Each of the brakes 241-244 can be referred to as a brake assembly, brake corner, brake assembly, a caliper/rotor assembly, etc. Each of the brakes 241-244 can be configured to respond, whether directly or in concert, to a deceleration action from the emulator 215 and/or controller 205.

In an embodiment, an application of the brake-by-wire system 150 can be adjusted based on the operational characteristics of the vehicle 100. For example, when the vehicle 100 of FIG. 1 is traveling at a slower speed the controller 205 can operate the actuator 210 to apply an increased amount of clamping force to a corresponding one of the brakes 241-244 at a slower rate than at a faster rate required when the vehicle 100 is travelling at a higher speed. Further, the controller 205 can monitor the wheels, determine if there is any wheel lockup, and adjust the amount of clamping force on any one of the brakes 241-244 to alleviate or prevent the lockup from occurring.

Figure 3:
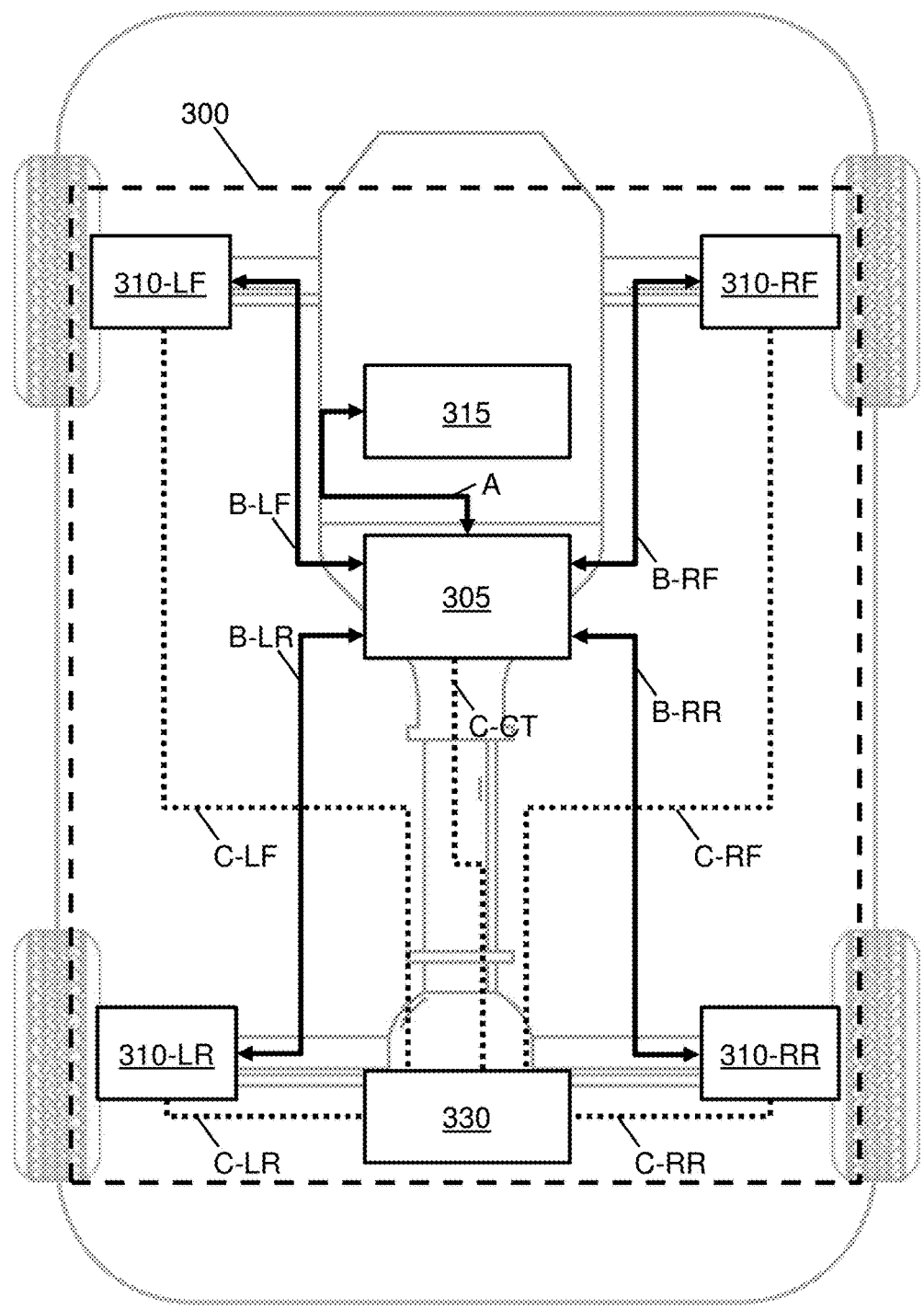
FIG. 3 is a brake-by-wire system in accordance with another embodiment.

Turning now to FIG. 3, the system 200 of FIG. 2 will now be described with reference to a system 300 according to an embodiment. As illustrated, the system 300 can include a controller 305, an actuator 310, an emulator 315, and power electronics 330. The items illustrated by FIG. 3 are representations and are not intended to be limiting. Thus, each component may represent a plurality of that component and/or each plurality may represent a singular iteration thereof. It should also be appreciated that the system 300 can include other components, that the system 300 can include fewer components, that the components can be embodied in separate arrangements in a distributed manner, and that the components can be embodied in an integrated control scheme. For example, the actuator 310 is illustrated as a plurality of actuators 310 notated by the actuator 310-LF, the actuator 310-RR, the actuator 310-LR, and the actuator 310-RF, where each actuator of the plurality is aligned with and controls braking at a corresponding wheel (of a vehicle 100 of FIG. 1).

The components of the system 300 can be electronically coupled and located throughout the vehicle 100 of FIG. 1, along with being configured to communicate/interact with each other. As shown in FIG. 3, signals and power wirings are identified by various arrows and lines. The signals/ communications between the controller 305 and the emulator 315 are indicated by the signal A and between the controller 305 and the actuators 310 are indicated by the signals B-LF, B-RR, B-LR, and B-RF. The power wirings C-CT, C-LF, C-RR, C-LR, and C-RF represent the coupling of the power electronics 330 and other components.

In general, the system 300 provides a braking scheme through a robust implementation of multiple components and/or algorithms that receive inputs from the emulator 315. The emulator 315 can be an electro-mechanical device that mimics a mechanical pedal of a hydraulic braking system (e.g., the emulator 315 can include a pedal assembly). The emulator 315 outputs at least one braking signal (e.g., signal A) to the controller 305.

The controller 305 can include any processing hardware, software, or combination of hardware and software utilized by the system 300 that implements architectures to achieve an operative level for the system 300. Note the controller 305 can be integrated into other controllers (e.g., such as the actuators 310 of the system 300), to reduce costs of additional hardware and/or software. The controller 305 can receive a plurality of inputs, which include inputs from the emulator 305. Further, the plurality of inputs can include engine revolutions per minute, vehicle speed, ambient temperature (e.g., in and/or outside of the vehicle), wheel speeds, inertial measurements, etc. The plurality of inputs can be used by the controller 305 to generate commands and/or currents that drive the actuators 310. The commands and/or currents can be responsive to one or more of the plurality of inputs. The commands and/or currents are, in turn, braking commands by the controller 305 to the actuators 310 based on the operation of the emulator 315.

By applying pressure to a brake pedal of the pedal assembly of the emulator 315, an operator causes signal A to be sent to the controller 305. The controller 305 can process an amount of force and a distance moved to detect that a brake signal is intended by the operator. For example, to detect a brake signal, the electric control unit 315 can compare the amount of force and/or the distance moved to a threshold or slope that may be stored in a look-up table, for instance, in the memory of the controller. If the brake signal is detected, the controller 305 can generate at least one braking command to the actuators 310. Each braking command, in general, can correspond to a particular actuator 310.

Figure 4:
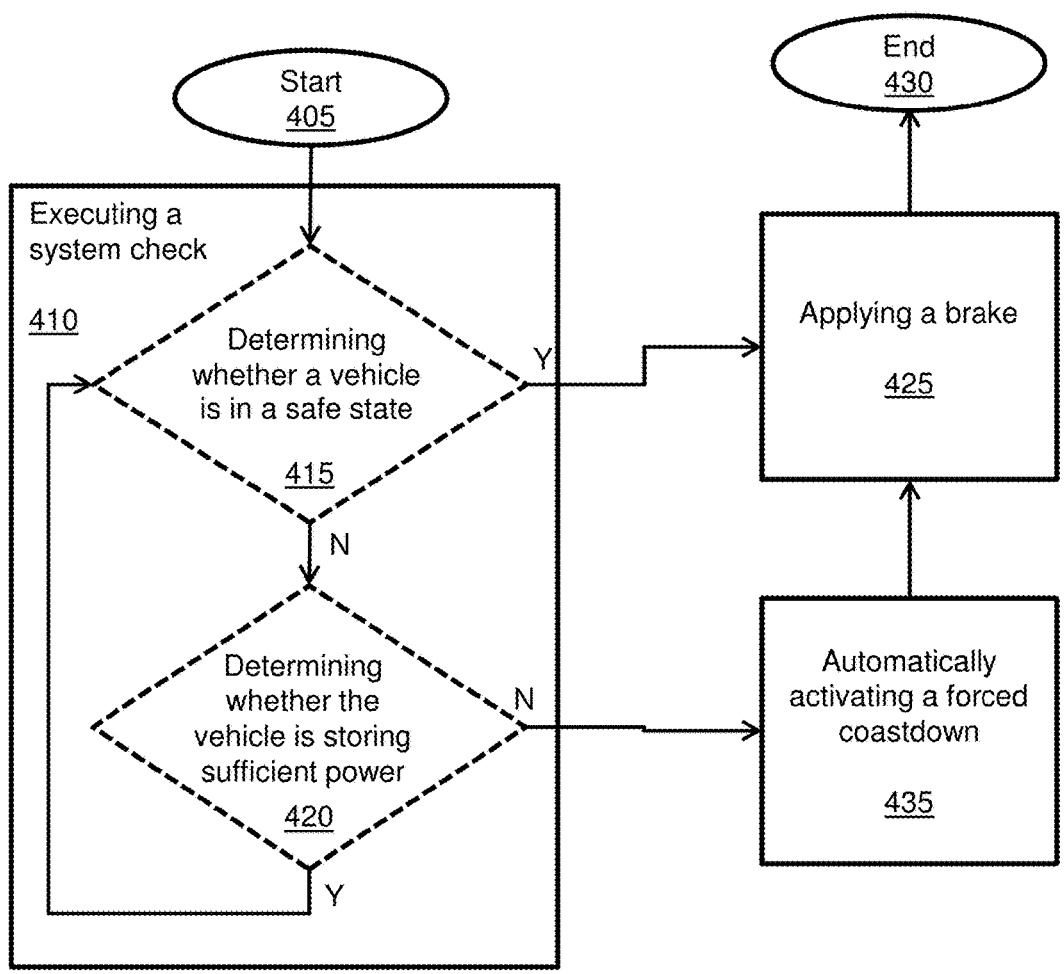
FIG. 4 is a process flow of a coastdown mode of a brake-by-wire system in accordance with another embodiment.

Example operations of the system 300 will now be described with respect to FIGS. 4 and 5. FIG. 4 is a process flow 400 of a coastdown mode of a brake-by-wire mechanism in accordance with an embodiment. The coast down mode is an operating scenario of the system 300 to automatically slow, stop, and secure the vehicle 100 operating on a depleting backup power source, in the event that an operator fails to manually slow, stop, and secure the vehicle 100. In this way, if the operator ignores failure notifications and does not stop the vehicle 100, the system 300 automatically uses brake pressure to control vehicle speed to a target profile designed to simulate a coast down on level ground. In an example, the coast down mode can be active primarily on downhill grades, where the vehicle is able to sustain motion for a long period of time even after propulsion capability has been disabled.

The process flow 400 begins at start circle 405 once the system 300 has previously determined that the system 300 is operating on back-up power. The controller 305 of the system 300 can make this determination based on communication with the power electronics 330. From the start circle 405, the process flow 400 proceeds to block 410. At block 410, the system 300 executes a system check. The system check enables the system 300 to retrieve and analyze system conditions. The controller 305 of the system 300 can perform the system check.

The system conditions include circumstances of and surrounding the vehicle 100. The system conditions can be detected based on the plurality of inputs (which are also described above), such as battery state of charge, battery voltage, battery capacity, wheel idle, wheel/vehicle speed, system component on/off, engine revolutions per minute, ambient temperature, inertial measurements, etc. The system conditions can be analyzed via comparisons against thresholds.

For example, block 410 includes decision blocks 415 and 420. At decision block 415, the system 300 determines whether the vehicle 100 is in a stable state. The stable state, in general, can be when the vehicle 100 is stationary or near stationary. If the vehicle 100 is determined to not be in the stable state (e.g., the system conditions do not meet or are outside of idle thresholds), then the process flow 400 proceeds to decision block 420 (as indicated by the 'N' arrow).

Further, at decision block 420, the system 300 determines whether the vehicle 100 is storing sufficient power for continued manual vehicle operation. If the system 300 has sufficient power for continued manual vehicle operation (e.g., the system conditions meet or are greater than power thresholds), then the system 300 can message an operator to manually place the vehicle in a stable state and the process flow 400 can loop back to decision block 415 (as indicated by the 'Y' arrow). In this way, the thresholds utilized during the system check can be predefined parameters that indicate the stable state and/or sufficient power for continued manual vehicle operation.

Returning to decision block 415, if the vehicle 100 is determined to be in the stable state (e.g., the system conditions meet or are within idle thresholds), then the process flow 400 proceeds to block 425 (as indicated by the 'Y' arrow). At block 425, the brake is applied. The brake can be the parking brake. With the parking brake engaged, the vehicle 100 is held in a stable/stationary state. From block 425, the process flow 400 proceeds to end circle 430, where the process flow 400 concludes.

Returning to decision block 420, if the system 300 does not have sufficient power for continued manual vehicle operation (e.g., the system conditions do not meet or are below power thresholds), then the process flow proceeds to block 435 (as indicated by the 'N' arrow). At block 435, the system 300 can automatically activate a forced coastdown of the vehicle 100 (e.g., use brake pressure to control vehicle speed to a stable state). In an embodiment, the system 300 automatically applies the forced coastdown when the vehicle is not in the stable state and the amount of energy is less than or equal to a threshold for continued manual vehicle operation. Next, the process flow 400 proceeds to block 425, where the brake is applied. With the parking brake engaged, the vehicle 100 is held in a stable/stationary state. From block 425, the process flow 400 proceeds to end circle 430, where the process flow 400 concludes.

Figure 5:
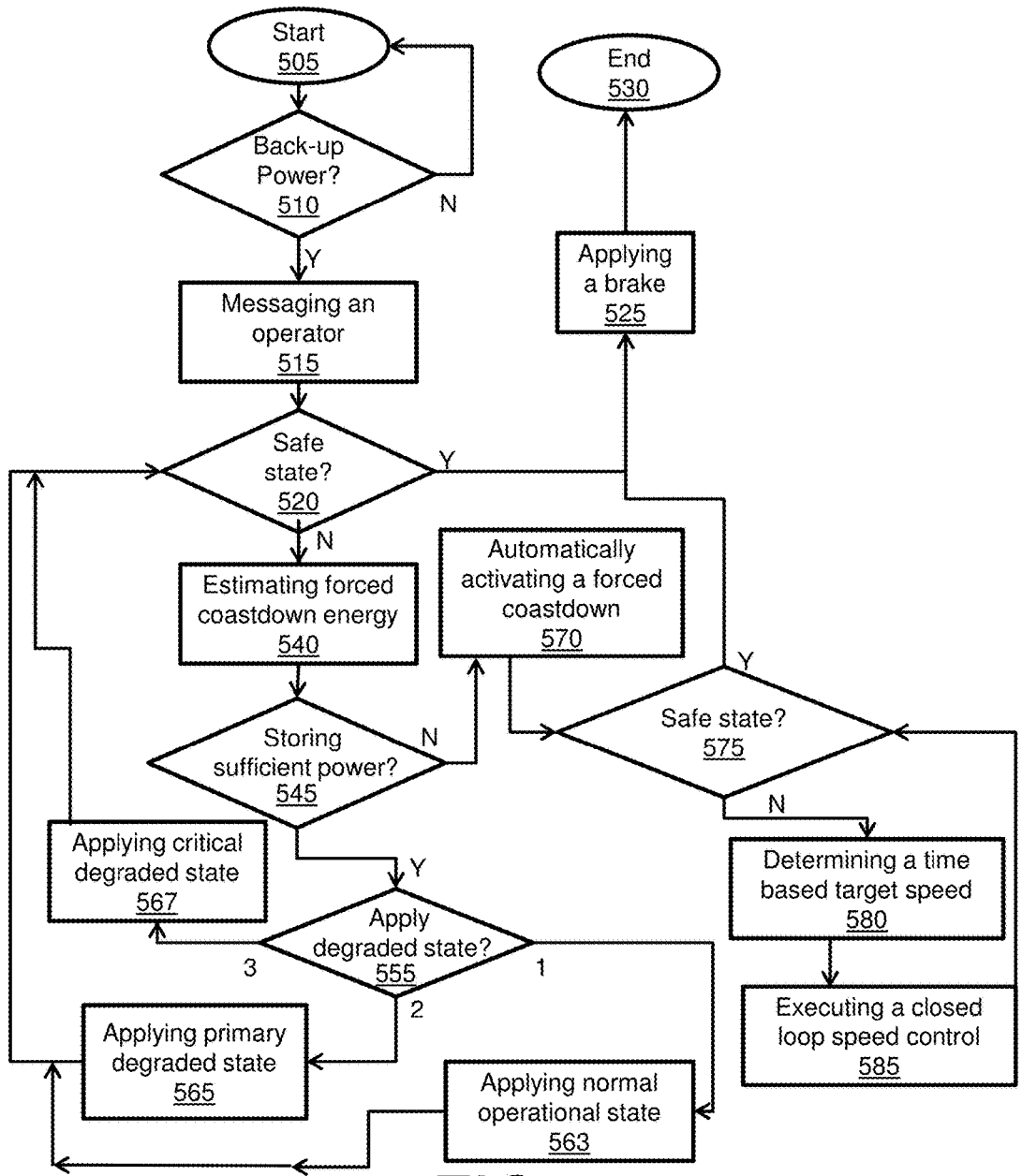
FIG. 5 is a process flow of a coastdown mode of a brake-by-wire system in accordance with another embodiment.

FIG. 5 illustrates another process flow 500 of a coastdown mode of a brake-by-wire mechanism in accordance with another embodiment. In this embodiment, the coastdown mode includes a coastdown curve that intrusively brakes/stops the vehicle 100 of FIG. 1 as if the vehicle 100 of FIG. 1 is on level ground. For instance, the coastdown curve implemented by the process flow 500 prevents vehicle runaway on a grade by detecting when the system 300 of FIG. 3 is operating on depleting power sources for an extended period of time and forcing an automatic coastdown to a stable state. This automatic coastdown by the process flow 500 accounts for any long downhill grade and an operator's failure to stop the vehicle, despite a propulsion system of the vehicle being disabled. In addition, the coastdown mode can enforce a brake-by-wire degraded state strategy (ensuring stable operation), while minimizing unnatural feel to the driver by dynamically tuning the coastdown curve.

The process flow 500 begins at start circle 505 and proceeds to decision block 510. At decision block 510, the system 300 determined whether the system 300 is operating on back-up power. The controller 305 of the system 300 can make this determination based on communication with the power electronics 330. If the system is not operating on back-up power, the process flow 500 can loop back to the start circle 505 and continue monitoring for when the system is on back-up power (as indicated by the 'N' arrow). If the system is operating on back-up power, the process flow 500 proceeds to block 515.

At block 515, the system 300 can message an operator. The controller 305 of the system 300 can control sending and displaying of the message (e.g., failure indications and warnings). For instance, the system 300 can activate a driver indication that informs the operator operating on back-up power. The driver indication can be a single Boolean light, where 'on' indicates utilization of the back-up power source and 'off' indicates utilization of the primary power source. The driver indication can be generated through a driver information center of the vehicle 100. The driver information center can be a dashboard console that includes lights and/or a display for providing messages to the operator, such as an alpha numeric message and/or a symbol indicating 'on' and 'off' conditions of the back-up power source.

Next, the process flow 500 proceeds to decision block 520, where the system 300 determines whether the vehicle 100 is in a stable state. If the vehicle 100 is determined to be in the stable state (e.g., the system conditions meet or are within the idle thresholds), then the process flow 500 proceeds to block 525 (as indicated by the 'Y' arrow). At block 525, the brake is applied. The brake can be the parking brake. With the parking brake engaged, the vehicle 100 is held in a stable/stationary state. From block 525, the process flow 500 proceeds to end circle 530 and concludes. If the vehicle is determined to not be in the stable state (e.g., the system conditions do not meet or are outside of the idle thresholds), then the process flow 500 proceeds to block 540 (as indicated by the 'N' arrow).

At block 540, the system 300 of FIG. 3 estimates an amount of energy required to execute a forced coastdown. The controller 305 of the system 300 of FIG. 3 can make this determination based on communication with the power electronics 330 of FIG. 3 and based on receiving a plurality of inputs. In general, to estimate the amount of energy, the system 300 of FIG. 3 determines how much power will be needed for an autonomously controlled deceleration and immobilization in the event of impending system unavailability. The system 300 of FIG. 3 can determine a grade of the ground or surface supporting the vehicle 100 of FIG. 1. That is, the system 300 of FIG. 3 can determine whether the grade of the surface supporting the vehicle 100 of FIG. 1 is greater than zero (e.g., a current surface grade) and/or determine whether the grade is dynamically changing over time (e.g., a grade delta). The current surface grade and/or the grade delta can be included in the estimating of the amount of energy needed for the autonomously controlled deceleration and immobilization of the vehicle 100 of FIG. 1. The process flow 500 then proceeds to block 545.

At decision block 545, the system 300 of FIG. 3 determines whether the vehicle 100 of FIG. 1 is storing sufficient power for continued manual vehicle operation. In an embodiment, the controller 305 of the system 300 of FIG. 3 determines whether a capacity of a back-up power source is greater than the estimated coastdown energy from block 540. Further, the controller 305 of the system 300 of FIG. 3 can also determines whether the capacity of the back-up power source is greater than the estimated coastdown energy from block 540 and an engineering margin. The engineering margin can be a predetermined amount of energy that is added to the estimated coastdown to assure that there will be enough to power the vehicle 100 of FIG. 1 during a forced coastdown during any system conditions. If the system 300 of FIG. 3 has sufficient power for continued manual vehicle operation (e.g., the system conditions meet or are greater than power thresholds), the process flow 500 proceeds to decision block 555 (as indicated by the 'Y' arrow).

At decision block 555, the system 300 of FIG. 3 determines whether a degraded state should be applied to the continued manual vehicle operation. A degraded state is operation mode that restricts certain functions of the vehicle 100 of FIG. 1, such as by limiting the propulsion system. Execution of the degraded state and transitions thereof can be defined by functional requirements of the vehicle, such as those set by a standards organization. For example, when the vehicle has switched to the back-up power source and the energy of that back-up power source is nearing a critical level, a degraded state can prevent the vehicle from accelerating and/or limit vehicle speed while allowing manual braking and steering. In this way, the degraded state can ensure vehicle operation by automatically eliminating any increases in vehicle kinetic energy and providing manual operation of the brakes.

As shown in FIG. 5, for example, the system 300 of FIG. 3 can determine whether one of three state options, two of which include a variation on a degraded state, should be applied to the continued manual vehicle operation. The three state options include a normal operational state, a primary degraded state, and a critical degraded state. The normal operational state is a vehicle mode where the operator has complete manual control of the vehicle. The primary degraded state is a vehicle mode where the operator has manual control of the vehicle 100 of FIG. 1 with limited propulsion capabilities. The critical degraded state is a vehicle mode where the operator has complete steering control and braking control (whether normal or degraded) of the vehicle 100 of FIG. 1 with no propulsion capabilities. The system 300 of FIG. 3 can determine which of three state options based on the how much of the stored back-up power is available for continued manual vehicle operation.

For instance, the controller 305 of the system 300 of FIG. 3 can determine if the capacity of the back-up power source is greater than, by a first percentage or a second percentage, the estimated coastdown energy from block 540 and the engineering margin. Note that the first percentage is greater than the second percentage.

If the capacity of the back-up power source is greater than the first percentage, then there is sufficient power for the normal operational state. If there is sufficient power for the normal operational state, the process flow 500 proceeds to block 563 (as indicated by the '1' arrow). The sufficient power in this case is enough total back-up power to energize all vehicle systems while the operator manually slows, stops, and secures the vehicle 100 of FIG. 1. At block 563, the normal operational state is applied to the vehicle and warning messages are issued to the operator (e.g., through the driver information center). From block 563, the process flow 500 proceeds to block 520.

If the capacity of the back-up power source is greater than the second percentage but less than or equal to the first percentage, then there is sufficient power for the primary degraded state. If the is sufficient power for the primary degraded state, the process flow 500 proceeds to block 565 (as indicated by the '2' arrow). The sufficient power in this case is enough total back-up power to energize manual control of the vehicle 100 of FIG. 1 with limited propulsion capabilities. At block 565, the primary degraded state is applied to the vehicle and corresponding messages are issued to the operator (e.g., through the driver information center). From block 565, the process flow 500 proceeds to block 520.

If the capacity of the back-up power source is greater than the first percentage but less than or equal to the second percentage, then there is sufficient power for the critical degraded state. If there is sufficient power for the critical degraded state, the process flow 500 proceeds to block 567 (as indicated by the '3' arrow). The sufficient power in this case is enough total back-up power to energize manual control of the vehicle 100 of FIG. 1 with no propulsion capabilities. At block 567, the critical degraded state is applied to the vehicle and corresponding messages are issued to the operator (e.g., through the driver information center). From block 567, the process flow 500 proceeds to block 520.

Returning to decision block 545, if the system 300 of FIG. 3 does not have sufficient power for continued manual vehicle operation (e.g., the system conditions do not meet or are below power thresholds), then the process flow proceeds to block 570 (as indicated by the 'N' arrow). That is, if the system 300 of FIG. 3 is running on back-up power and there is not enough back-up power to continue running the system 300, then the capacity of the back-up power source will be less than the estimated coastdown energy from block 540. In turn, the system should perform a forced coastdown.

At block 570, the system 300 can automatically activate the forced coastdown of the vehicle 100 (e.g., use brake pressure to control vehicle speed to a stable state). The forced coastdown is applied to the vehicle based on the operation of decision block 575, block 580, and 585. At block 575, where the system 300 determines whether the vehicle 100 is in a stable state. If the vehicle is determined to not be in the stable state (e.g., the system conditions do not meet or are outside of the idle thresholds), then the process flow 500 proceeds to block 580 (as indicated by the 'N' arrow). At block 580, the system 300 of FIG. 3 determines a time based target speed. The time based target speed is a dynamic value calculated by the system 300 of FIG. 3 that identifies a desired vehicle speed with respect to time. From block 580, the process flow 500 proceeds to block 585, where the system executes a closed loop speed control based on the time based target speed (i.e., vehicle speed is controlled using brake pressure), thereby providing a controlled vehicle deceleration. This controlled vehicle deceleration when on a downhill grade can have a profile similar to a normal lift throttle coastdown on level ground.

The process flow 500 returns to block 575, where the system 300 of FIG. 3 again determines whether the vehicle 100 is in a stable state. If the vehicle is determined to not be in the stable state, then the process flow 500 loops through blocks 580 and 585. In this way, the system 300 of FIG. 3 can account for worse case environmental condition combined with lack of operator response to failure indications. A worse case environmental condition is a very long grade, which requires the vehicle 100 to be stopped and secured on an incline.

If the vehicle 100 of FIG. 1 is determined to be in the stable state (e.g., the system conditions meet or are within the idle thresholds), then the process flow 500 proceeds to block 525 (as indicated by the 'Y' arrow). At block 525, a brake (such as a parking brake, i.e., mechanically latching) is applied. From block 525, the process flow 500 proceeds to end circle 530, where the process flow 500 concludes.

Embodiments herein provide advantages in lowering the amount of effort required to stop a vehicle. Further advantages and technical benefits include providing a controlled vehicle deceleration on a downhill grade, with a profile similar to a lift throttle coastdown on level ground. Advantages and technical benefits also include ensuring proper execution of degraded state transitions as defined by functional requirements and ensuring vehicle operation by automatically eliminating vehicle kinetic energy while service brakes are still available when worse case environmental conditions are combined with lack of operator response to failure indications.

Aspects of embodiments herein are described with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the FIGS. illustrate the architecture, operability, and operation of possible implementations of systems, methods, and computer program products according to various embodiments. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the FIGS. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The flow diagrams depicted herein are just one example. There may be many variations to this diagram or the steps (or operations) described therein without departing from the spirit of the disclosed. For instance, the steps may be performed in a differing order or steps may be added, deleted or modified. All of these variations are considered a part of the claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the embodiments have been described, it will be understood by those skilled in the art that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the disclosure not be limited to the particular embodiments disclosed, but that the disclosure will include all embodiments falling within the scope of the application.

What is claimed is:

1. A method of executing a forced coastdown of a vehicle, the method implemented by a controller of a brake-by-wire portion of a vehicle system of the vehicle, the method comprising:
    analyzing conditions of the vehicle system to determine whether the vehicle is in a stable state and to determine an amount of energy available to the vehicle system; and
    automatically applying the forced coastdown when the vehicle is not in the stable state and the amount of energy is less than or equal to a threshold for continued manual operation of the vehicle, wherein the forced coastdown comprises utilizing brake pressure to reduce a speed of the vehicle.

2. The method of claim 1, wherein the method comprises:
    determining that the vehicle system is operating on back-up power,
    wherein the amount of energy is an amount of the back-up power.

3. The method of claim 1, wherein the method comprises:
    determining whether a degraded state should be applied to the continued manual operation of the vehicle.

4. The method of claim 1, wherein the method comprises:
    determining an amount of energy required to execute the forced coastdown based on a surface grade.

5. The method of claim 1, wherein the forced coastdown comprises providing a controlled vehicle deceleration of the speed of the vehicle based on a time based target speed.

6. The method of claim 1, wherein the stable state includes when the vehicle is stationary.

7. The method of claim 1, wherein the forced coastdown comprises utilizing brake pressure to reduce the speed of the vehicle to a target profile that simulates a level ground coastdown.

8. The method of claim 1, wherein the conditions of the vehicle system indicate circumstances of and surrounding the vehicle.

9. The method of claim 1, wherein the conditions of the vehicle system are detected based on a plurality of inputs, the plurality of inputs comprising a battery state of charge of a back-up power source and wheel speeds,
    wherein the battery state of charge is utilized by the vehicle system to determine the amount of energy, and
    wherein the wheel speeds are utilized by the vehicle system to determine the speed of the vehicle.

10. The method of claim 1, wherein the method comprises:
    engaging a parking brake to secure the vehicle in a stationary state when the vehicle is in the stable state.

11. A vehicle system of a vehicle, the vehicle system comprising:
    a brake-by-wire portion comprising a controller configured to cause a forced coastdown of the vehicle by causing the vehicle system to perform:
    analyzing conditions of the vehicle system to determine whether the vehicle is in a stable state and to determine an amount of energy available to the vehicle system; and
    automatically applying the forced coastdown when the vehicle is not in the stable state and the amount of energy is less than or equal to a threshold for continued manual operation of the vehicle, wherein the forced coastdown comprises utilizing brake pressure to reduce a speed of the vehicle.

12. The vehicle system of claim 11, wherein the controller is configured to cause the vehicle system to perform:
    determining that the vehicle system is operating on back-up power,
    wherein the amount of energy is an amount of the back-up power.

13. The vehicle system of claim 11, wherein the controller is configured to cause the vehicle system to perform:
    determining whether a degraded state should be applied to the continued manual operation of the vehicle.

14. The vehicle system of claim 11, wherein the controller is configured to cause the vehicle system to perform:
    determining an amount of energy required to execute the forced coastdown based on a surface grade.

15. The vehicle system of claim 11, wherein the forced coastdown comprises providing a controlled vehicle deceleration of the speed of the vehicle based on a time based target speed.

16. The vehicle system of claim 11, wherein the stable state includes when the vehicle is stationary.

17. The vehicle system of claim 11, wherein the forced coastdown comprises utilizing brake pressure to reduce the speed of the vehicle to a target profile that simulates a level ground coastdown.

18. The vehicle system of claim 11, wherein the conditions of the vehicle system indicate circumstances of and surrounding the vehicle.

19. The vehicle system of claim 11, wherein the conditions of the vehicle system are detected based on a plurality of inputs, the plurality of inputs comprising a battery state of charge of a back-up power source and wheel speeds,
wherein the battery state of charge is utilized by the vehicle system to determine the amount of energy, and
wherein the wheel speeds are utilized by the vehicle system to determine the speed of the vehicle.

20. The vehicle system of claim 11, wherein the controller is configured to cause the vehicle system to perform:
engaging a parking brake to secure the vehicle in a stationary state when the vehicle is in the stable state.

* * * * *